United States Patent
Carper

Patent Number: 5,219,103
Date of Patent: * Jun. 15, 1993

[54] REFRIGERATOR COFFEE DISPENSER HAVING AN AUGER AND A PICK-UP WHEEL

[75] Inventor: Dwight A. Carper, Lincoln Township, Berrien County, Mich.

[73] Assignee: Whirlpool Corporation, Benton Harbor, Mich.

[*] Notice: The portion of the term of this patent subsequent to Mar. 5, 2008 has been disclaimed.

[21] Appl. No.: 814,173

[22] Filed: Dec. 30, 1991

[51] Int. Cl.⁵ .............................................. B67D 5/62
[52] U.S. Cl. .................................. 222/240; 222/413; 198/531; 198/550.1; 198/671
[58] Field of Search ..................... 222/146.6, 239, 240, 222/241, 242, 357, 369, 412, 413; 198/550.1, 531, 671

[56] References Cited

U.S. PATENT DOCUMENTS

| | | | |
|---|---|---|---|
| 1,039,352 | 9/1912 | Bernotowicz | 222/233 X |
| 3,197,083 | 7/1965 | Elliott et al. | 222/231 |
| 3,940,033 | 2/1976 | Brian | 222/452 |
| 4,018,366 | 4/1977 | Ficken et al. | 222/412 |
| 4,019,660 | 4/1977 | Berkey | 222/304 |
| 4,136,803 | 1/1979 | Tobias et al. | 222/413 |
| 4,394,940 | 7/1983 | Peterson | 222/276 |
| 4,557,404 | 12/1985 | Solomon | 222/325 |
| 4,802,609 | 2/1989 | Morse et al. | 222/413 X |
| 4,997,109 | 3/1991 | Carper | 222/146.6 |

*Primary Examiner*—Andres Kashnikow
*Assistant Examiner*—Anthoula Pomrening
*Attorney, Agent, or Firm*—Stephen D. Krefman; Thomas J. Roth; Thomas E. Turcotte

[57] ABSTRACT

An apparatus for the storage and dispensing of particulate coffee in a domestic refrigerator comprising a sealed bin for preserving the freshness of the particulate coffee and a manually operated transfer mechanism for dispensing the coffee into a container for the preparation of coffee beverages. The transfer mechanism includes a rotary auger and a pick-up wheel disposed within the bin and operatively connected to a manual crank on the front of the bin. The auger feeds the coffee to the pick-up wheel, which deposits the coffee into a graduated chute from which the user may dispense the coffee to a suitable container.

22 Claims, 2 Drawing Sheets

REFRIGERATOR COFFEE DISPENSER HAVING AN AUGER AND A PICK-UP WHEEL

TECHNICAL FIELD

This invention relates to apparatus for storing particulate coffee in a domestic refrigeration appliance, and dispensing the particulate coffee for use in a coffee beverage making appliance.

BACKGROUND OF THE DISCLOSURE

Coffee is typically sold in particulate form in a sealed metal can or foil pouch to preserve freshness until the time of use by the consumer. After opening the sealed coffee container, the consumer may preserve the freshness of the coffee by storing the container in a refrigerator or freezer. The coffee is typically dispensed from the storage container by use of a teaspoon or measuring scoop.

A number of devices are known for dispensing a quantity of particulate coffee, as disclosed in U.S. Pat. Nos. 4,557,404 (Solomon); 4,394,940 (Peterson); 4,019,660 (Berkey); and 3,940,033 (Brian). These devices are primarily intended to dispense instant coffee rather than fresh particulate coffee, and are not adapted for use within a refrigerator or freezer.

DISCLOSURE OF THE INVENTION

The present invention is concerned with a particulate coffee storage and dispensing apparatus adapted for use in a domestic refrigerator or freezer which maintains the freshness of the particulate coffee and provides for convenient dispensing of the particulate coffee according to the user's present needs.

More specifically, the invention comprehends a bin of suitable dimensions for use in a domestic refrigerator or freezer compartment. The bin includes a sealed lid which preserves the freshness of the particulate coffee contained therein.

The invention further comprehends a manually operated dispensing means located within the bin consisting of a rotary auger and a pick-up wheel operated by a hand crank located on the front of the bin. The auger feeds the particulate coffee to the pick-up wheel, which in turn deposits the coffee into a dispensing chute. Graduations on the dispensing chute indicate the quantity of coffee contained in the chute. When a sufficient quantity of coffee has been deposited into the chute, the coffee may be emptied from the chute into a container for the preparation of coffee beverages.

BRIEF DESCRIPTION OF THE DRAWING

Other features and advantages of the invention will be apparent from the following description taken in connection with the accompanying drawing wherein.

DETAILED DESCRIPTION OF THE PREFERRED EMBODIMENT

Figure 1:
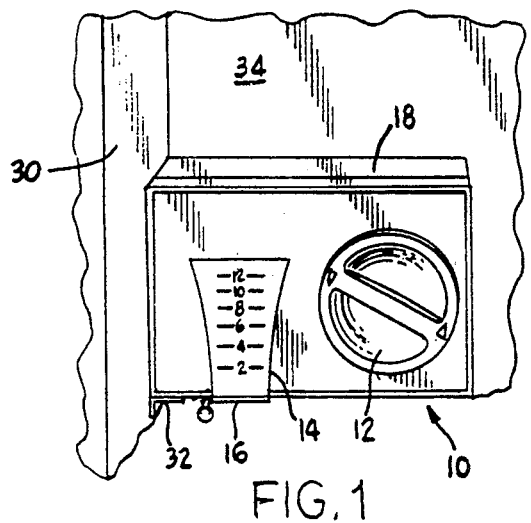
FIG. 1 is a perspective view of an apparatus for the storage and dispensing of particulate coffee mounted within the refrigerated space of a domestic refrigeration appliance.
Figure 7:
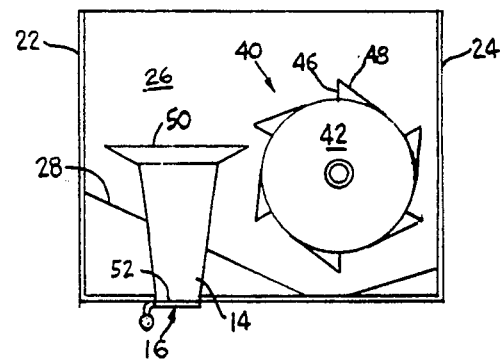
FIG. 7 is a fragmentary vertical longitudinal view of the apparatus along line 7—7 of FIG. 4.

In the illustrative embodiment of the invention as disclosed in the drawing, an apparatus is provided for storing and dispensing particulate coffee in a refrigerated compartment of a domestic refrigeration appliance. As disclosed in FIG. 1, the apparatus 10 may be suitably mounted in the freezer compartment 34 of a domestic refrigerator, such as by hanging the apparatus 10 on a wall support 32, or alternately by placing it upon a shelf.

Figure 2:
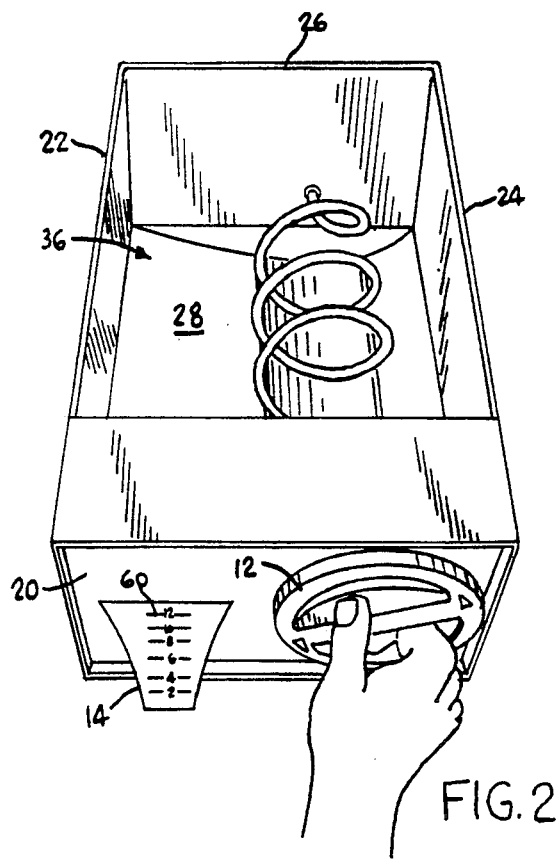
FIG. 2 is a fragmentary perspective view illustrating the use of the apparatus for dispensing particulate coffee to a container.
Figure 3:
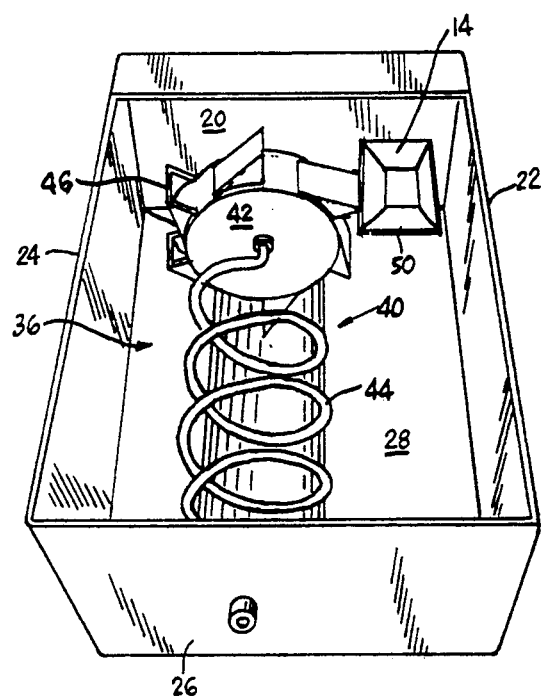
FIG. 3 is a rear perspective view of the coffee dispensing apparatus.
Figure 5:
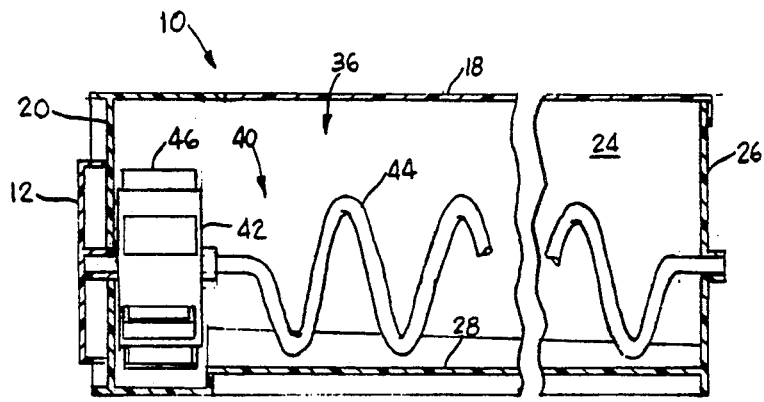
FIG. 5 is a fragmentary longitudinal horizontal section of the apparatus along line 5—5 of FIG. 4.
Figure 4:
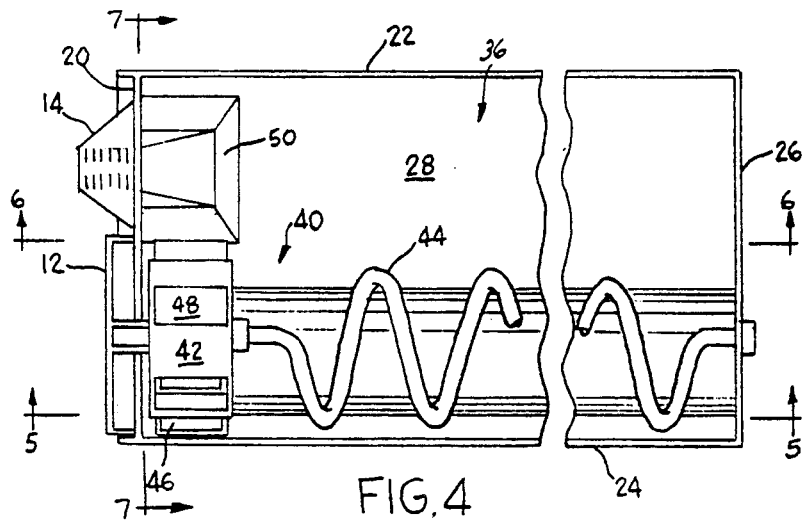
FIG. 4 is a fragmentary elevation view of the apparatus with the lid removed for clarity.
Figure 6:
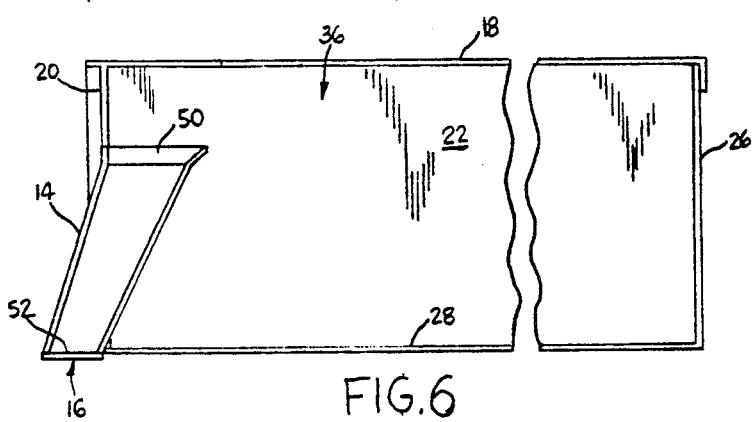
FIG. 6 is a fragmentary vertical longitudinal section of the apparatus along line 6—6 of FIG. 4.

As shown in FIG. 2, the apparatus 10 includes a front wall 20, a rear wall 26, left and right side walls 22 and 24, respectively, and a bottom wall 28, forming an open bin 36 for storage of the particulate coffee. The bottom wall 28 of the bin consists of a floor which slopes downward from the two side walls to direct coffee toward the center of the bin. A lid 18 covers the top opening of the bin. The lid 18 is removable to allow particulate coffee to be deposited into the bin. The lid provides a seal over the top of the bin to preserve the freshness of the coffee stored therein.

The apparatus also includes a transfer mechanism 40 mounted on and within the bin to allow dispensing of the particulate coffee from the bin 36. A rotary hand crank 12 is disposed on the outside of the front wall 20 of the apparatus, and is operatively connected to a pick-up wheel 42 located inside the front of the bin and a helical rotary auger 44 disposed horizontally along the center of the floor of the bin.

Rotation of the hand crank 12 causes rotation of the auger 44 and the pick-up wheel 42. The sloping floor of the bin feeds coffee toward the rotary auger, and the auger pushes the coffee from the rear of the bin toward the pick-up wheel at the front of the bin. As shown in FIGS. 4 through 7, the pick-up wheel 42 includes a plurality of circumferentially located scoops 46 which pick up a small quantity of coffee as they rotate past the floor 28 of the bin.

A dispensing chute 14 is located directly adjacent to the pick-up wheel 42 at the front of the bin. The chute 14 is oriented diagonally, with a top opening 50 inside the top of the front wall 20 of the bin, and a bottom opening 52 located outside the bottom of the front wall 20 of the bin. A movable door 16 normally closes the bottom opening of the chute.

The scoops 46 located on the pick-up wheel 42 are oriented so that after each scoop rotates over the top of the pick-up wheel, the particulate coffee contained in the scoop is dumped therefrom onto the back side 48 of the scoop directly beneath it. The back 48 of the lower scoop serves as a ramp to direct the coffee into the top opening 50 of the dispensing chute 14. The coffee falls to the bottom of the closed chute and gradually collects therein as the hand crank is rotated. The dispensing chute 14 is made of transparent or translucent material so that the volume of coffee within the chute is visible to the user. Graduated markings 60 are located on the chute to indicate the exact measurement of the volume of coffee contained within the chute.

Figure 8:
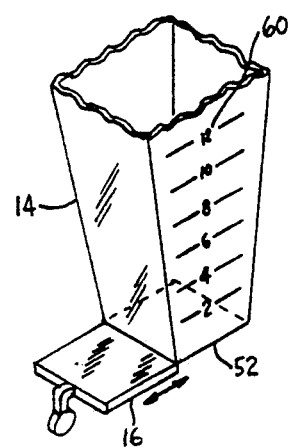
FIG. 8 is a partial perspective view of the dispensing chute and bottom door.

The user may continue to rotate the hand crank 12 until the required volume of coffee is deposited within the chute 14, as indicated by the graduated markings 60. The movable door 16 which normally closes the bottom 52 of the chute 14 may then be opened as shown in FIG. 8 to permit the coffee contained within the chute to be dumped into a suitable container, such as the filter housing of an automatic drip coffee maker.

The use of the above described apparatus provides convenient means for storing and dispensing particulate coffee in the refrigerated compartment of a domestic refrigerator. The sealed bin preserves the freshness of the coffee contained therein. The dispensing mechanism provides a convenient means for obtaining the exact quantity of coffee required by the user without opening the sealed bin. The apparatus offers a substantial improvement over the common practice of storing coffee within a sealed container in a refrigerator, which requires retrieving the container from the refrigerator, scooping out the required quantity of coffee, and then re-sealing the container and replacing it in the refrigerator.

The foregoing disclosure of specific embodiments is illustrative of the broad inventive concepts comprehended by the invention.

I claim:

1. An apparatus for storing and dispensing particulate coffee, said apparatus comprising:
   a portable storage receptacle for storing particulate coffee and dispensing said coffee from a front portion thereof;
   manually operable conveying means disposed within said storage receptacle for conveying said particulate coffee towards the front portion of said storage receptacle at a variable rate;
   transfer means operably connected to said conveying means and disposed within said storage receptacle at said front portion of said storage receptacle for receiving said particulate coffee from said conveying means and transferring said coffee out of said storage receptacle at a variable rate of predetermined increments providing suitable quantity control for coffee making; and
   a dispensing chute disposed on said front portion of said storage receptacle, said dispensing chute having an upper opening for receiving coffee from said transfer means disposed within said storage receptacle, and a lower opening for dispensing said coffee out of said dispensing chute disposed external from said storage receptacle.

2. The coffee storage and dispensing apparatus as claimed in claim 1, with said dispensing chute further comprising closure means disposed on said lower opening and manually movable between a closed position wherein said particulate coffee is contained in said dispensing chute, and an open position where said coffee is dispensed from said dispensing chute.

3. The coffee storage and dispensing apparatus as claimed in claim 2, wherein at least a portion of said dispensing chute is constructed of a transparent material, whereby the volume of coffee contained in said dispensing chute is visible.

4. The coffee storage and dispensing apparatus as claimed in claim 3, wherein said transparent portion of said dispensing chute includes measuring graduations superimposed thereon to indicate the volume of coffee contained in said dispensing chute.

5. The coffee storage and dispensing apparatus as claimed in claim 1, wherein said storage receptacle has an open top portion for receiving a supply of said particulate coffee, and a removable lid for sealably closing said top portion of said storage receptacle.

6. The coffee storage and dispensing apparatus as claimed in claim 1, wherein said storage receptacle has a sloped bottom wall for directing said particulate coffee towards said conveying means.

7. The coffee storage and dispensing apparatus as claimed in claim 1, wherein said conveying means comprises an auger means operatively connected to a manual crank and rotatable along a horizontal axis for conveying said particulate coffee towards said front portion of said storage receptacle.

8. The coffee storage and dispensing apparatus as claimed in claim 7 wherein said transfer means comprises a pick-up wheel having a plurality of scoops disposed on the periphery thereof for picking up discrete quantities of particulate coffee, said pick-up wheel operatively connected to said manual crank and rotatable about said horizontal axis for dumping said coffee from said scoops into said dispensing chute.

9. The coffee storage and dispensing apparatus as claimed in claim 8 wherein each of said scoops includes a back surface extending angularly outward from the pick-up wheel such that after one of said scoops rotates past the top of the pick-up wheel, the back surface of said scoop serves as a ramp to direct particulate coffee from another of said scoops into said dispensing chute.

10. An apparatus for storing and dispensing particulate coffee, said apparatus comprising:
    a portable storage receptacle removably mountable in a refrigeration space for storing particulate coffee and dispensing said coffee from a front portion thereof;
    a rotatable auger disposed within said storage receptacle for conveying said particulate coffee towards the front portion of said storage receptacle at a variable rate;
    a pick-up wheel operably connected to said auger and deposited at said front portion of said storage receptacle, said pick-up wheel having a plurality of scoops disposed thereon for receiving said particulate coffee from said auger and transferring said coffee out of said storage receptacle at a variable rate;
    a manually operated crank disposed on said apparatus for imparting rotational force to said auger and said pick-up wheel at a variable rate;
    a dispensing chute disposed on said front portion of said storage receptacle, said dispensing chute having an upper opening for receiving coffee from said pick-up wheel, and a lower opening for dispensing said coffee out of said dispensing chute.

11. The coffee storage and dispensing apparatus as claimed in claim 10 wherein each of said scoops includes a back surface extending angularly outward from the pick-up wheel such that after one of said scoops rotates past the top of the pick-up wheel, the back surface of said scoop serves as a ramp to direct particulate coffee from another of said scoops into said dispensing chute.

12. The coffee storage and dispensing apparatus as claimed in claim 10, with said dispensing chute further comprising closure means disposed on said lower opening and manually movable between a closed position wherein said particulate coffee is contained in said dispensing chute, and an open position where said coffee is dispensed from said dispensing chute.

13. The coffee storage and dispensing apparatus as claimed in claim 12, wherein at least a portion of said dispensing chute is constructed of a transparent material, whereby the volume of coffee contained in said dispensing chute is visible.

14. The coffee storage and dispensing apparatus as claimed in claim 13, wherein said transparent portion of said dispensing chute includes measuring graduations superimposed thereon to indicate the volume of coffee contained in said dispensing chute.

15. The coffee storage and dispensing apparatus as claimed in claim 10, wherein said storage receptacle has an open top portion for receiving a supply of said particulate coffee, and a removable lid for sealably closing said top portion of said storage receptacle.

16. The coffee storage and dispensing apparatus as claimed in claim 10, wherein said storage receptacle has a sloped bottom wall for directing said particulate coffee towards said auger.

17. An apparatus for storing and dispensing particulate coffee in a refrigerated compartment of a domestic refrigeration appliance, said apparatus comprising:
- a portable storage receptacle removably mountable in a refrigerated compartment of said refrigeration appliance for storing particulate coffee and dispensing said coffee from a front portion thereof, said storage receptacle including a front wall, a rear wall, first and second side walls, and a bottom wall, with said walls together forming an open vessel to receive particulate coffee;
- a rotatable auger disposed within said open vessel for conveying said particulate coffee toward the front portion of said storage receptacle at a variable rate;
- a pick-up wheel operably connected to said auger and disposed at said front portion of said vessel, said pick-up wheel having a plurality of scoops disposed thereon for receiving said particulate coffee from said auger and transferring said coffee out of said vessel at a variable rate;
- a manually operated crank disposed on said front wall of said storage receptacle for imparting rotational force to said auger and said pick-up wheel at a variable rate; and
- a dispensing chute disposed on said front wall of said storage receptacle, said dispensing chute having an upper opening in communication with the interior of said open vessel for receiving coffee from said pick-up wheel, and a lower opening disposed outside said vessel for dispensing said coffee out of said dispensing chute.

18. The coffee storage and dispensing apparatus as claimed in claim 17, with said dispensing chute further comprising closure means disposed on said lower opening and manually movable between a closed position wherein said particulate coffee is contained in said dispensing chute, and an open position where said coffee is dispensed from said dispensing chute.

19. The coffee storage and dispensing apparatus as claimed in claim 18, wherein at least a portion of said dispensing chute is constructed of a transparent material, whereby the volume of coffee contained in said dispensing chute is visible.

20. The coffee storage and dispensing apparatus as claimed in claim 19, wherein said transparent portion of said dispensing chute includes measuring graduations superimposed thereon to indicate the volume of coffee contained in said dispensing chute.

21. The coffee storage and dispensing apparatus as claimed in claim 17, wherein said storage receptacle has a removable lid for sealably closing said open vessel of said storage receptacle.

22. The coffee storage and dispensing apparatus as claimed in claim 17, wherein said bottom wall of said storage receptacle slopes downwardly from each of said first and second side walls towards the center of said open vessel for directing said particulate coffee towards said auger.

* * * * *